United States Patent
Jahn et al.

(10) Patent No.: US 12,078,776 B2
(45) Date of Patent: Sep. 3, 2024

(54) STRUCTURAL ARRANGEMENT FOR A TIPPING BUCKET RAIN GAUGE AND RELATED MICRO CONTROLLED ELECTRONIC SYSTEM

(71) Applicant: DUALBASE TECNOLOGIA ELETRÔNICA LTDA, Palhoça (BR)

(72) Inventors: Felipe Jahn, Palhoça (BR); Gustavo Ventura, Palhoça (BR)

(73) Assignee: DUALBASE TECNOLOGIA ELETRÔNICA LTDA, Palhoça (BR)

( * ) Notice: Subject to any disclaimer, the term of this patent is extended or adjusted under 35 U.S.C. 154(b) by 312 days.

(21) Appl. No.: 17/442,315

(22) PCT Filed: Mar. 26, 2019

(86) PCT No.: PCT/BR2019/050102
§ 371 (c)(1),
(2) Date: Sep. 23, 2021

(87) PCT Pub. No.: WO2020/191466
PCT Pub. Date: Oct. 1, 2020

(65) Prior Publication Data
US 2022/0155487 A1    May 19, 2022

(51) Int. Cl.
*G01W 1/14*    (2006.01)
*G01D 3/08*    (2006.01)

(52) U.S. Cl.
CPC .............. *G01W 1/14* (2013.01); *G01D 3/08* (2013.01)

(58) Field of Classification Search
CPC .................................. G01W 1/14; G01D 3/08
See application file for complete search history.

(56) References Cited

U.S. PATENT DOCUMENTS 3,485,096 A * 12/1969 Miller ..................... G01W 1/14
                                                        73/170.23
3,943,762 A    3/1976 Baer
4,578,995 A    4/1986 Meyer
(Continued)

FOREIGN PATENT DOCUMENTS

BR    102014030023-6 A2    7/2016
CN    1632621 A            11/2008
(Continued)

*Primary Examiner* — Jill E Culler
(74) *Attorney, Agent, or Firm* — B. Aaron Schulman, Esq.; Stites & Harbison, PLLC

(57) ABSTRACT

A structural arrangement for a tipping bucket rain gauge and related micro controlled electronic system, the features of which include remote monitoring and identification of possible operating faults or defects in the rain gauge such as jamming of the tipping bucket or clogging of the funnel by reading data from the sensor and the pulse generator and also possible measurement errors caused by defects in the sensor or in the pulse generator or caused by inclination or vibration of the rain gauge. Such monitoring is provided by a capacitive sensor arranged such as to detect the accumulation of water in the funnel and also water flow, and by a pulse generator arranged to measure the number of movements of the tipping bucket and includes a control module that communicates with the capacitive sensor and with the pulse generator of the tipping bucket and with an accelerometer provided in the control module itself.

5 Claims, 4 Drawing Sheets

(56) References Cited

U.S. PATENT DOCUMENTS

| | | | | |
|---|---|---|---|---|
| 4,644,786 A | * | 2/1987 | Jacobsen | G01W 1/14 |
| | | | | 177/94 |
| 5,898,110 A | * | 4/1999 | Hagstrom | G01W 1/14 |
| | | | | 73/1.16 |
| 2017/0261453 A1 | * | 9/2017 | Dumitru | H10N 30/40 |

FOREIGN PATENT DOCUMENTS

| | | | |
|---|---|---|---|
| CN | 202141820 U | * | 2/2012 |
| CN | 203643624 U | | 6/2014 |
| CN | 204331072 U | | 5/2015 |
| CN | 105572766 A | | 5/2016 |
| CN | 208224513 U | | 12/2018 |

* cited by examiner

STRUCTURAL ARRANGEMENT FOR A TIPPING BUCKET RAIN GAUGE AND RELATED MICRO CONTROLLED ELECTRONIC SYSTEM

BACKGROUND OF THE INVENTION

This patent document refers to a configuration applied in a tipping bucket rain gauge, as know as tipping bucket pluviometer, which is an instrument used by meteorologists and hydrologists to gather and measure the amount of liquid precipitation over an area in a predefined area, in a period of time; and it also refers to its micro controlled electronic system.

It is known in state of art, various constructive forms of rain gauges whose is distinguished each other according to its application, construction, measurement accuracy, etc.

Basically, a tipping bucket rain gauge is comprised to a body containing a catchment funnel at the top and a base containing a tipping bucket with a dosage predetermined by the operator and comprising means to detect the tipping bucket movement. Normally it has a point to help leveling, most commonly the spirit level that will assist at the time of installation.

From this construction, other configurations are known in the current state of the art, in order to improve or add other functionalities, according to specific needs, such as detecting other information, such as floods, for example, as well as sending, processing and storage of database.

Some documents that describe rain gauges can be cited, such as the document CN204331072 which presents an intelligent rain gage containing an electronic device with the function of predicting floods. The document CN202141820 presents a tipping rain gauge that comprises a mechanism for detecting abnormal accumulations of liquid in the catchment funnel area. The document U.S. Pat. No. 3,943,762 discloses a particular mechanism for detecting/measuring the tilt of a rain gauge where a counter device is activated by pulses generated by its pivotal movement.

Another document is CN203643624, which presents a constructive form of tipper for a tipping bucket rain gauges that allows sand or dust to be eliminated from the tipper, improving the accuracy of the measurement provided by the rain gauge.

There is also the document CN105572766, which describes a constructive disposition in rain gauges that aims to improve the accuracy of the measurement in regions that present intense rains and still present a simplified constructive form.

These documents describe devices comprised in the state of the art, and they are very well known and widely used for measurements of climatic factors, more specifically the levels of rain. As they are equipment used in an open environment, and subject to the weather, it is essential that they are robust and carefully installed, to provide accurate measurements of the climatic condition, avoiding that the measurements are disturbed by the conditions of the environment.

Some criteria drastically influence the achievement of the real amount of rain by a tipping bucket rain gauge, one of the problems is the inclination of the device in relation to the plane where it is installed; this problem can cause large measurement errors, reaching or even exceeding 20%. The most aggravating factor to this problem is that the technician responsible for reading the device can take months to detect the failure, as it needs to be done inloco, or even never to detect, due to the difficulty of access to the place that was installed, being that in some cases access to the equipment is only by helicopter, boats, among other expensive and difficult means of availability.

Another problem related to the measurement errors of a tipping bucket rain gauges, which it seeks a solution, is that due to the equipment being installed in open and remote areas, it is subject to impregnation of dirt, which can lead to clogging in the region of the catchment funnel, by the accumulation of leaves, bird droppings, dead insects, etc.; or in the failure to detect the pulse generation, which measures the movement of the tipping bucket, due to its mechanical locking, caused by some external factor, such as the presence of an anthill; or caused by an internal factor, such as the bearing damaged resulting in its locking, or by the non-functioning of the pulse generating device, or failures in the sensor. The detections of these failure can take weeks or months, which could represent weeks or months of invalid data.

Also by the fact that this equipment is used in open areas and is subject to bad weather, the support where the equipment is installed, is subject to the same vibrations. These vibrations, if excessive, can lead to measurement errors, as they can cause disturbances in the equipment resulting in erroneous data, reducing the equipment's operating reliability.

In the event of a clogging of the catchment funnel, the captured water will not be transferred to the tipping bucket, resulting in a zero value of rain detected. In case of the lock of the tipping bucket, or of the non-functioning of the pulse generating device, no matter how much water passes from the catchment funnel to the tipping bucket, there will be no counting of pulses, showing value zero in measurement. Likewise, there may also be an unexpected ratio for the amount of flow through the catchment funnel to the movement of the tipping bucket, which could be an error related to the tipping bucket, or related to the funnel, or related to the measuring devices.

In order to make the measurement of the amount of rain more reliable, solving the problems of errors or measurement failures, caused by any of the problems mentioned, whether due to excessive vibration, or by tilting the equipment, or by the clogging of the catchment funnel, or due to the locking of the tipping bucket, or failures related to the measuring devices, was developed the tipping bucket rain gauge described in this document, with an improved constructive configuration, comprising a microcontrolled electronic system containing specific elements interconnected in a specific way, able to identify the main problems and failures of the main elements of the pluviometer. Its constructive configuration includes a capacitive sensor coupled in the region of the catchment funnel, and a pulse generator device coupled in the central region after the tipping bucket, whose function is to measure its movement; both connected to a control and processing module, also arranged in the rain gauge. The electronic processing and control module is comprised of the ND input port, where it will be connected to the capacitive sensor, I/O ports (input/output) where the pulse generator device will be connected. It also provides an accelerometer for measuring the inclination and vibration detection, all connected to a microcontroller that receives information from the accelerometer, capacitive sensor, and pulse generating device, processes the data and sends it to its output ports, being serial communication ports and/or communication ports wireless communication, to communicate with the data collection platform in addition to being able to include light indicators for the case of information regarding the inclination.

A characteristic of the object of the present patent document, comprising a capacitive sensor arrangement, a pulse generating device, connected with the control and electronic processing module, and an accelerometer, it is possible to detect errors, failures and malfunctions of the rain gauge, relating its main parts and elements as a whole. Errors, failures and malfunctions related to the catchment funnel, due the processing data from the capacitive sensor. As the control and processing module also receives information from the pulse generating device, it is also possible to identify the measurement failure caused by the non-pulse generation of the tipping bucket movement; or failures relating to the disproportionate flow ratio between the of water that passes through the catchment funnel, with the movement of the tipping bucket. This means, if there is a flow of water in the funnel, the tipping bucket should move periodically during a known period for a given flow; if this does not occur, the tipping bucket may have been blocked, or there is some failure in the generating device; in both cases this failure can be detected by configuration applied to the rain gauge and its specific system presented here.

Other characteristic refers to the fact that it provides an accelerometer arranged in the control and electronic processing module, it detects the inclination of the equipment, as well as its vibration in cases of bad installation, external agents or bad weather (strong winds, hail, etc.), sending the data to the microcontroller that will make it available to the output ports for sending to the data collection platform. In the case of the slope, data is also made available to the light indicator module.

DESCRIPTION OF THE DRAWINGS

The constructive configuration applied to the tipping bucket rain gauge and its microcontrolled system, matter of the present patent document, is better understood through the detailed description presented below, together with the attached drawings, given by way of example and illustration, and not limiting the object of the present document.

DETAILED DESCRIPTION OF THE INVENTION

Figure 1A:
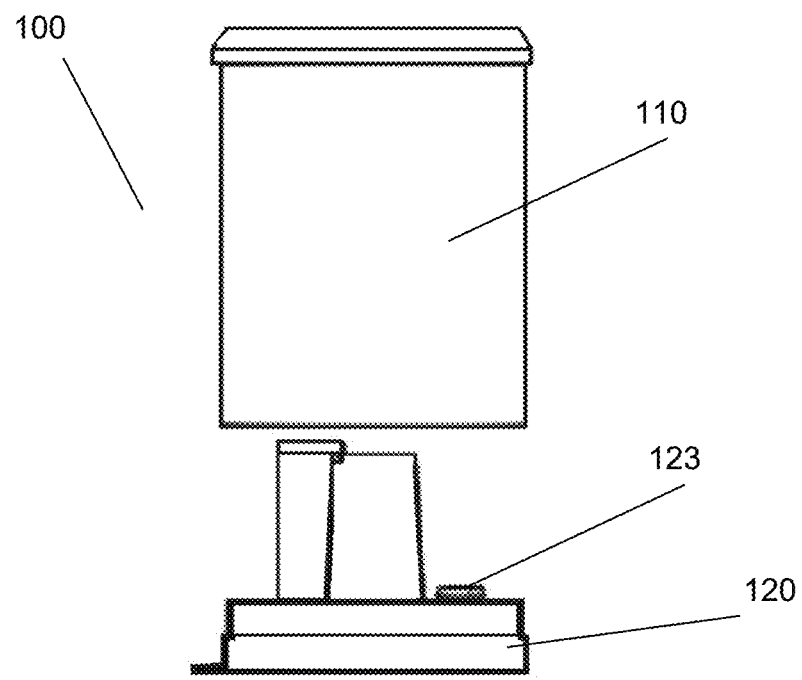
FIG. 1A illustrates the constructive configuration of the tipping bucket rain gauge, showing in an exploded way, the body (110) and the base (120) with the microcontrolled system.
Figure 1B:
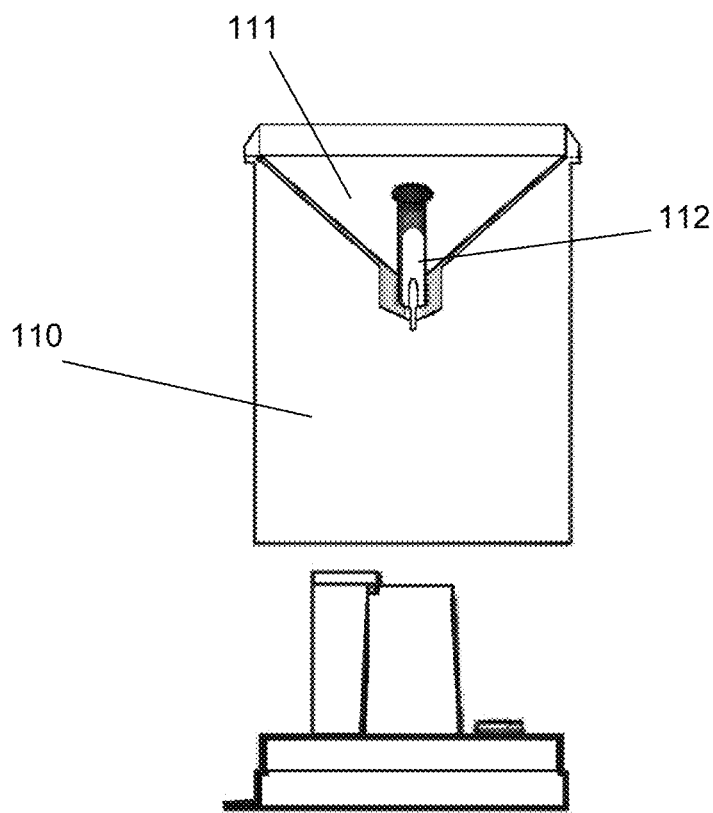
FIG. 1B shows the same view but with the body (110) in section, showing the catchment funnel (111) inside the body (110) to facilitate the understanding of its internal configuration.
Figure 2A:
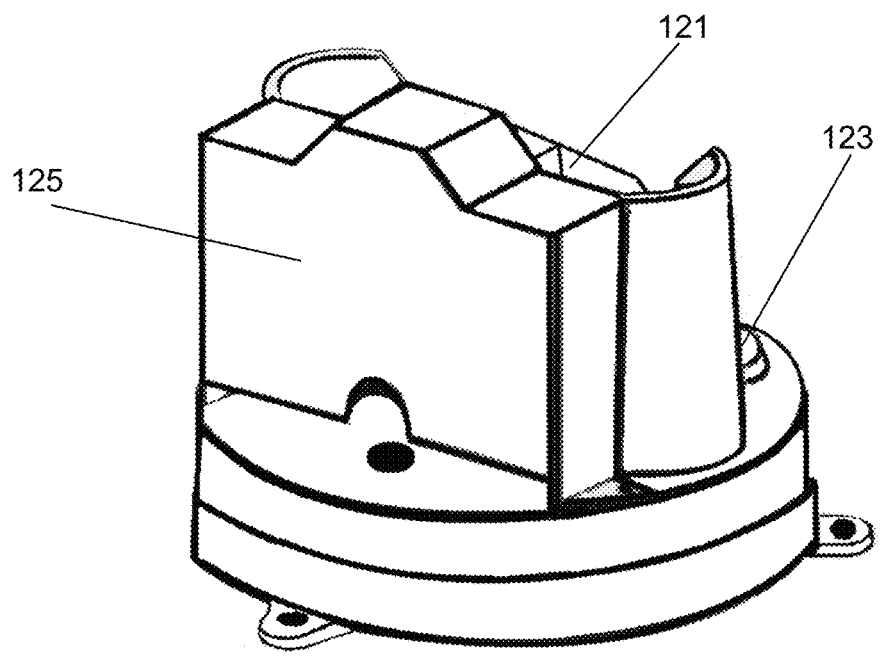
FIGS. 2A and 2B illustrate the base, part of the tipping bucket rain gauge, showing it completely assembled in FIG. 2A, and without the protective cover of the electronic assembly in FIG. 2B.
Figure 2B:
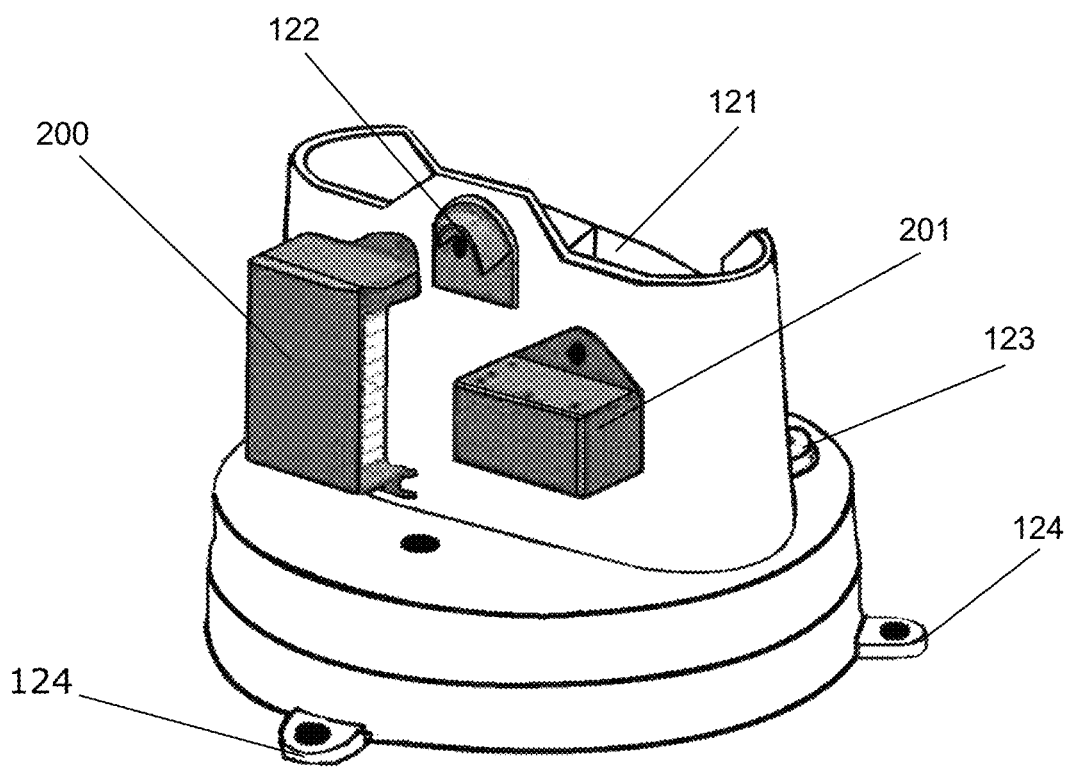

According to FIGS. 1A and 1B, shown, the rain gauge (100) is comprised of an upper body (110) mounted on a base (120). In the upper body (110), is provided a catchment funnel (111) for collecting water, so that the collected water is carried into the inside of the rain gauge to the base region (120). In the region of the funnel (111) a capacitive sensor (112) is provided, capable of detecting the presence of water, and the flow of water through the catchment funnel (111), as well as accumulation of water, in the referred catchment funnel (111) that is not flowing into the tipping bucket (121).

The base (120) contains the region of the tipping bucket (121) where it receives water from the catchment funnel (111) and the tipping bucket (121) mounted on an axis containing pulse generator (122) whose function is to measure the number of movements of the referred tipping bucket (121); the operation of said tipping bucket (121) is already technical knowledge in the field of application related to rain gauges. Said base (120) also provides means for draining the water poured through the tipping bucket (121), in addition to a level (123), of bubble, to facilitate the adjustment of the leveling of the pluviometer, at the moment of its installation or maintenance, by means of height adjustment of your feet (124).

It also includes, inside the said tipping bucket rain gauge (100), a control module (200) providing a specific system, arranged preferably in the base (120), which communicates with the capacitive sensor (112), arranged in a region of the catchment funnel (111), and with the pulse generator (122) of the tipping bucket (121), and with accelerometer (203) placed in referred module (200). A protective cover (125) is provided over the electronic set disposed in the rain gauge (100) in order to protect it from the weather.

Figure 3A:
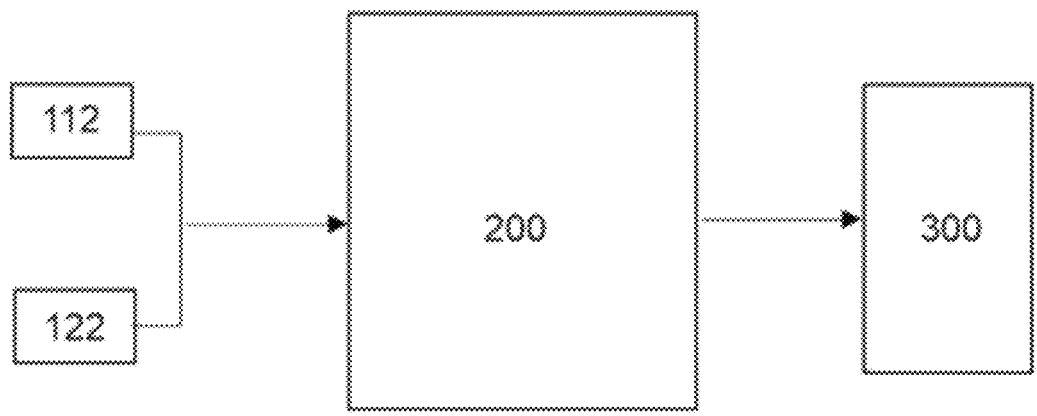
FIGS. 3A and 3B illustrate, respectively, in a block diagram, the communication system of the mechanical elements and sensors of this pluviometer with its processing and control module and sending the data to a data collection platform, and a schematic representation of the data module. processing and control that comprises this tipping bucket rain gauge.

Thus, as shown in FIG. 3A, the capacitive sensor (112) informs the control module (200) of the accumulation of water in the catchment funnel (111) and its respective flow rate, and the pulse generator (122) also tells the control module (200) the movement of the tipping bucket (121); and the control module (200) has specific configuration and programming to know the ratio between the amount of liquid flow inside the catchment funnel (111) with the number of movements of the tipping bucket (121), in order to process this ratio and send it to the platform (300) of data collection, which will be used for the management and control, by the user, of one or more rain gauges (100) in operation.

Figure 3B:
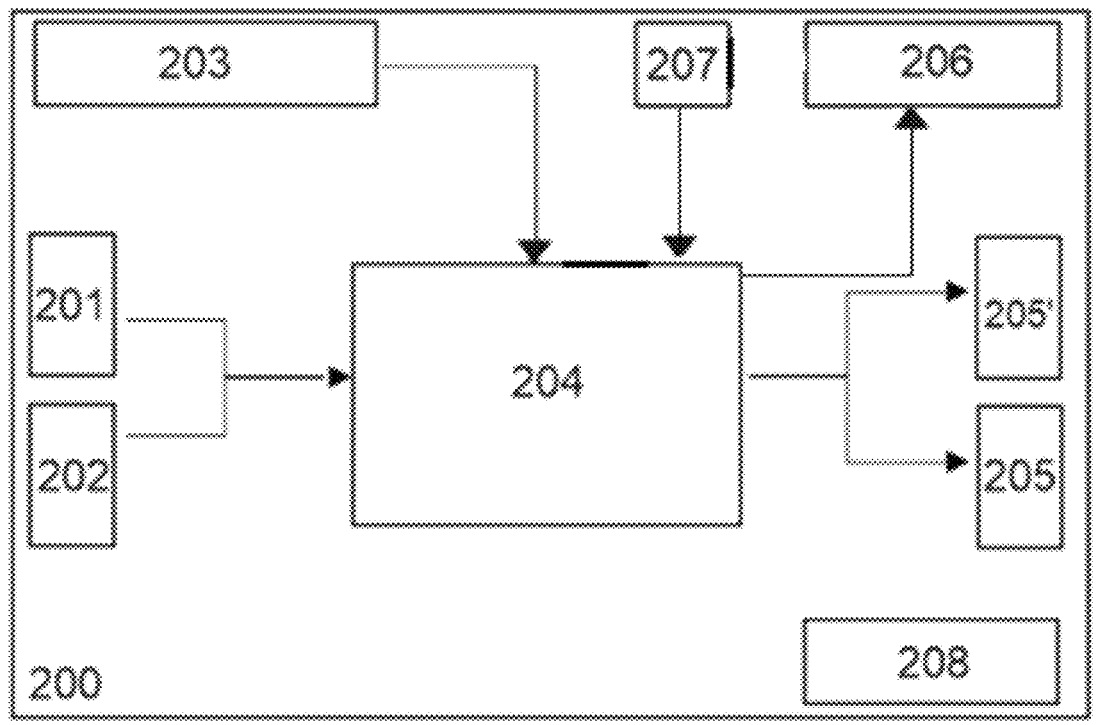

The control module (200), as shown in FIG. 3B, is comprised of an input port with A/D converter (201), where it will be connected to the capacitive sensor (112), and ports (202) I/O (input/Output) where the pulse generator device (122) will be connected and also provides an accelerometer (203) for measuring the inclination and vibration detection, all connected to a microcontroller (204) that receives the information from the accelerometer (203), from the sensor (112) capacitive, and the pulse generator device (122), processes the data, which consists of a systematic ratio between the presence of water in the funnel (111), the flow of liquid passing through the funnel (111), with the movement of the tipping bucket (121), and the detection of vibration and tilt by the accelerometer (203), and sends it to its output ports wired (205) and/or wireless (205), these being the serial and/or wireless communication ports to communicate with the data collection platform (300), monitored and managed by the user. Said control module (200) can include luminous indicators (206) in case of information regarding the inclination, as well as these indicators (206) being activated by a luminosity sensor (207) in order to save energy. Said control module (200) provides power supply (208) as well as can also provide memory module, for data storage (not shown in the figure).

In this way, with the rain gauge (100) comprising the control system, it will allow identifying and inform possible defects or failures in itself operation, by reading the data from the sensor (112) and the pulse generator (122) and processing of this information by the control module (200) and processing, as well as possible measurement errors due to the inclination or vibration of the rain gauge by processing the information from the accelerometer (203) included in the control module (200). If the flow ratio of liquid that pass through the funnel (111) and tipping bucket (121) movement, associated with vibration or tilt of the equipment, to be incompatible with the expected values, a failure in equipment is reported.

Thus, if the sensor (112) identifies that the catchment funnel (111) is being filled and water is being flowing down to the tipping bucket (121), but the referred tipping bucket (121) is not moving, or its movement is out of the estimated period for that flow, the control module (200), which receives this information, will acknowledge that there is a problem with the pulse generator (122) or some problem that is preventing the movement of the referred tipping bucket (121), such as the presence tingling, or shaft locking, among others. In this case, the control module (200) will inform that there is some problem related to the tipping bucket (121).

In case of the capacitive sensor (112), it identifies the accumulation of water in the funnel (111), however the non-flow to the tipping bucket (121), means that water enters the funnel (111), however, there is no water flow down to the tipping bucket (121), the control module (200), which receives this information, will acknowledge that there is some problem with the funnel clogging (111) if it identifies that the tipping bucket (121) is also without movement; or some problem could be occurring in the capacitive measuring sensor (112), in case it identifies that the tipping bucket (121) is making its movement.

Figure 4:
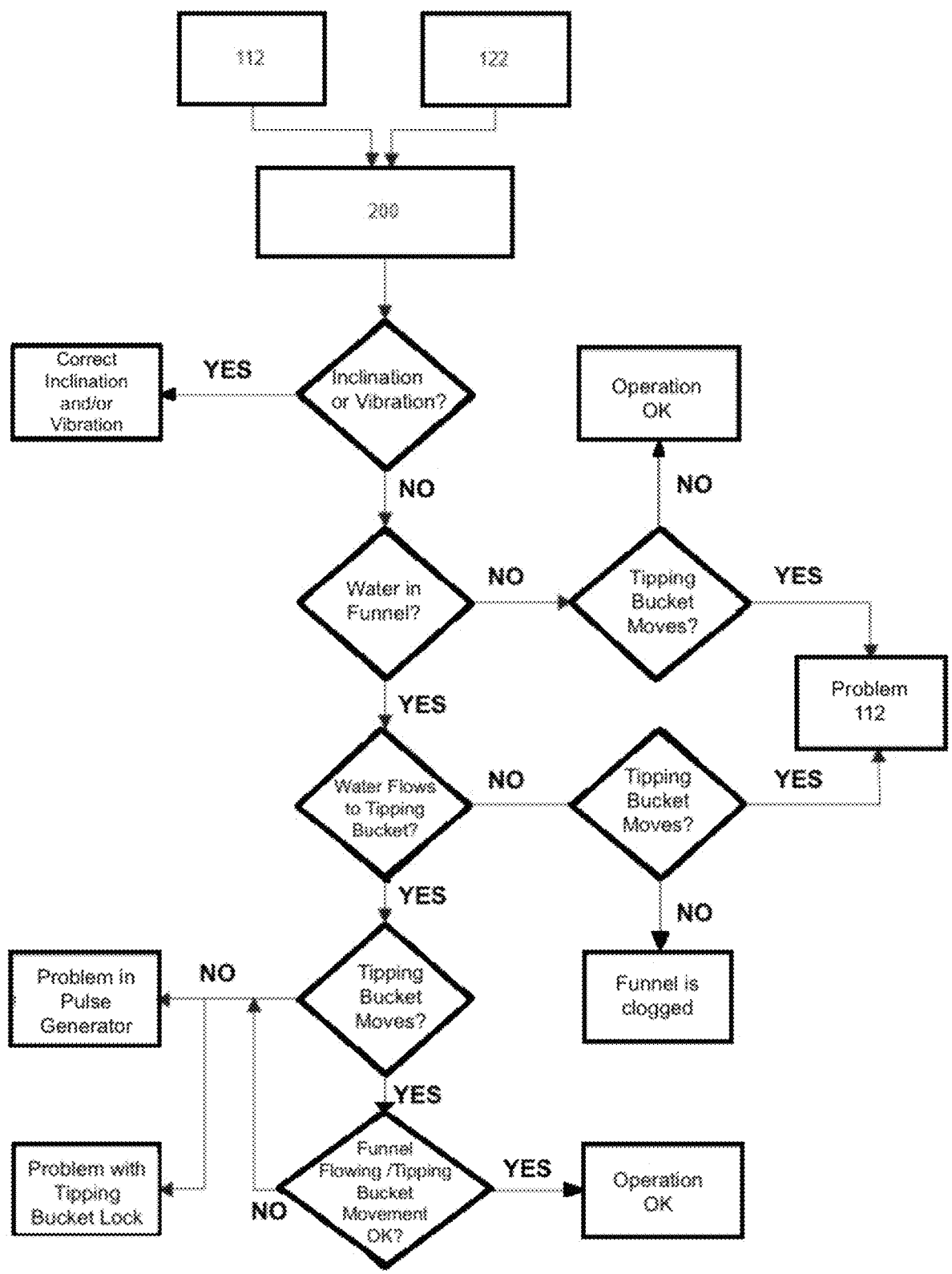
FIG. 4 shows the flowchart of the microcontrolled electronic rain gauge (100) in an illustrative way, showing, in an illustrative way, the information regarding the operation of the rain gauge.

FIG. 4 illustrates the flowchart of the microcontrolled electronic rain gauge (100) to illustrate the behavior of the system included in said rain gauge. It can be explained how the capacitive sensor (112) informs the control module (200) about the accumulation of water in the funnel (111) and its respective flow rate, and the pulse generator (122) also informs to the control module (200) the movement of the tipping bucket (121); the control module (200), in turn, identifies through the information from your accelerometer (203) the correct inclination and vibration levels of the equipment; if "NO" is correct, it reports "problem with inclination or vibration".

Said control module (200) identifies, through the information of the capacitive sensor (112), the presence of water in the funnel (111): if there is "NO" water in the funnel (111), check if the tipping bucket (121) is in motion, if "NO", the operation is OK; if the tipping bucket (121) is moving, the control module (200) will report a possible problem in the capacitive sensor (112), why in fact there is a flow but it is not being measured. It will also check the water flow to the tipping bucket (121), where if there is "NO" flow to the referred tipping bucket (121), but the control module (200) identifies its movement, so that is probably why there is operating or measurement error of the sensor (112); if there is not even the movement of the tipping bucket (121), the said control module (200) communicates a probable problem of clogging in the catchment funnel (111).

If there is a filling of the funnel (111), with flow down to the tipping bucket (121), this system continues monitoring its movement, because if "NO" there is its movement, or the relation of the movement of the tipping bucket (121) with the flow of water in the funnel (111), is not like expected, probably there are problems with the pulse generator (122) that may not be performing the correct measurement, or there may be some mechanical locking of your movement, like an anthill, for example, or bearing problems, or other problems. If the movement of the tipping bucket (121) is taking place correctly, as well as the other measurements, the system reports OK operation of the rain gauge (100). In other words: i) if catchment funnel (111) with water and flow, and tipping bucket (121) stopped or with less than expected movement in relation to flow—reports error related to the tipping bucket (121) (pulse generator, or tipping locking); ii) if catchment funnel (111) with water and flow, and tipping bucket (121) with movement greater than expected in relation to the flow—reports an error related to possible congestion in the passage of the funnel (111) or problem in the sensor (112) that measures the flow; iii) if catchment funnel (111) with water and NO flow, and tipping bucket (121) with movement—reports an error related to possible clogging of the funnel (111) passage or problem with the sensor (112) that measures the flow; iv) if catchment funnel (111) with NO water and tipping bucket (121) with movement—reports an error related to the tipping bucket (121) (generating no pulse), or related to the sensor (112) (reporting water or flow nonexistent); v) if vibration or inclination outside the pre-established limit—reports error related to vibration and/or inclination of the equipment.

The invention claimed is:

1. Structural arrangement for a tipping bucket rain gauge and related micro controlled electronic system comprising a rain gauge comprising
   an upper body
   mounted on a base and
   a catchment funnel is arranged on the upper body for collecting water, so that the collected water is conducted into the inside of the rain gauge until the region of the base, and
   said base is comprised of the tipping bucket, mounted on an axis, and that receives the water from the catchment funnel, wherein is provided a capacitive sensor, in the region of the catchment funnel, capable of detecting the accumulation of water in the funnel and the flow through the orifice of
   said funnel and the axis on which the tipping bucket is mounted contains a pulse generator, in order to measure the number of movement of the tipping bucket and comprise a control module with an accelerometer and a microcontroller which communicates with said accelerometer, with the capacitive sensor and with the pulse generator of the tipping bucket, and the control module having a specific processing and control system, so that the capacitive sensor informs the control module about accumulation of water in the funnel and its respective flow, and the pulse generator informs the control module about the movement of the tipping bucket, and the accelerometer informs the inclination and vibration of the rain gauge, and by the control module doing the processing of ratio of the amount of flow of the funnel with the number of movements of the tipping bucket, and with the data of vibration or inclination, in order to identify possible defects and failures in the operation of the rain gauge-, as well as possible measurement errors related to inclination or vibration unexpected of equipment, and reports this information to a data collection platform, monitored and managed by the user.

2. Structural arrangement for a tipping bucket rain gauge and related micro controlled electronic system according to claim 1, said control module comprising input port with A/D converter to communicate with the capacitive sensor, and ports I/O (input/output) to communicate with the pulse generator device, and the accelerometer all connected to the microcontroller that receives the information from the accelerometer, the capacitive sensor, and the pulse generating device, processes the data and sends it to its compatible output ports to communicate with the data collection platform.

3. Structural arrangement for a tipping bucket rain gauge and related micro controlled electronic system according to claim 2 wherein the communication ports are wired.

4. Structural arrangement for a tipping bucket rain gauge and related micro controlled electronic system according to claim 2 wherein the communication ports are wireless.

5. Structural arrangement for a tipping bucket rain gauge and related micro controlled electronic system according to claim 1 wherein the control module provides a memory module to store the processed data.

* * * * *